J. N. MAHONEY.
VEHICLE BRAKING SYSTEM.
APPLICATION FILED MAR. 25, 1907. RENEWED AUG. 16, 1911.
1,005,252.
Patented Oct. 10, 1911.
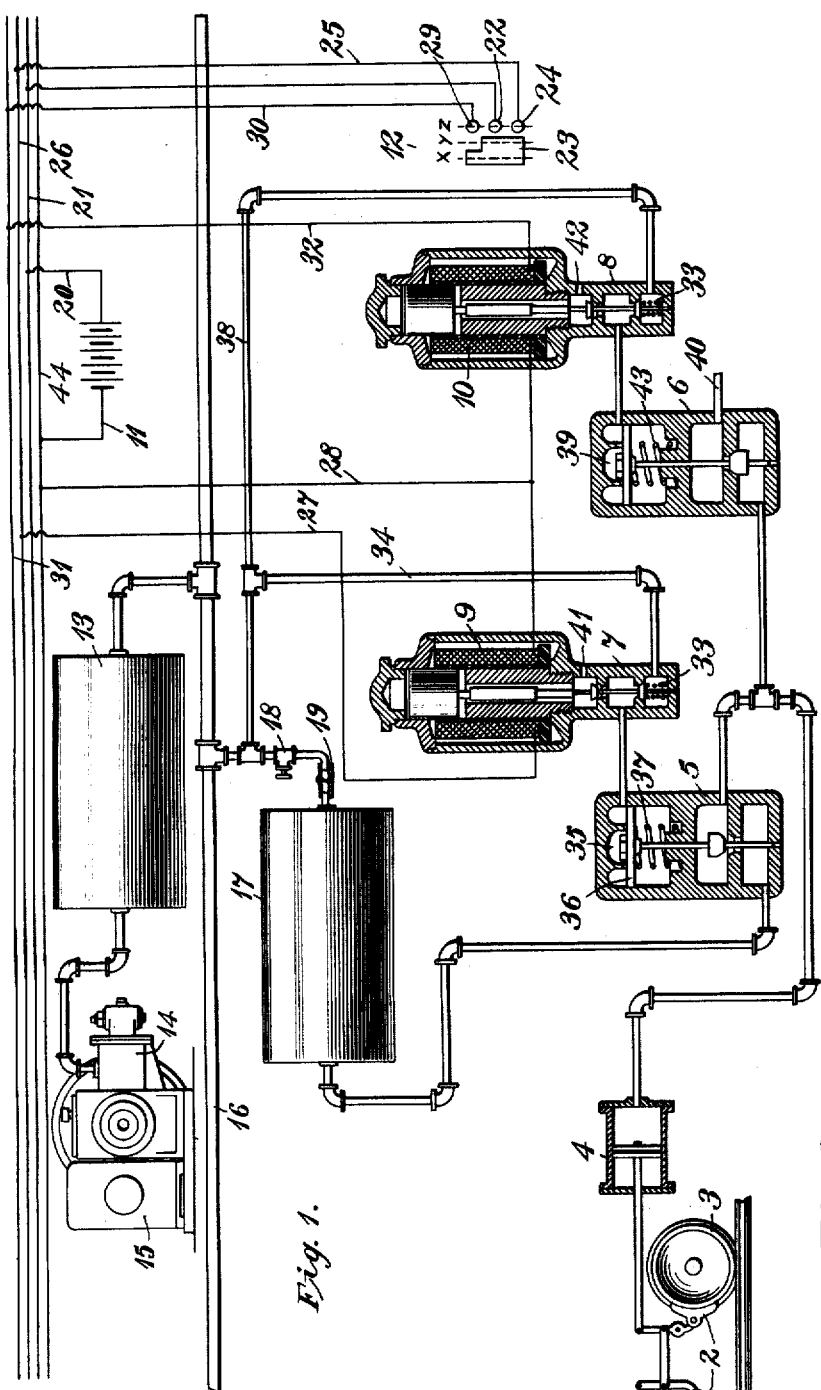
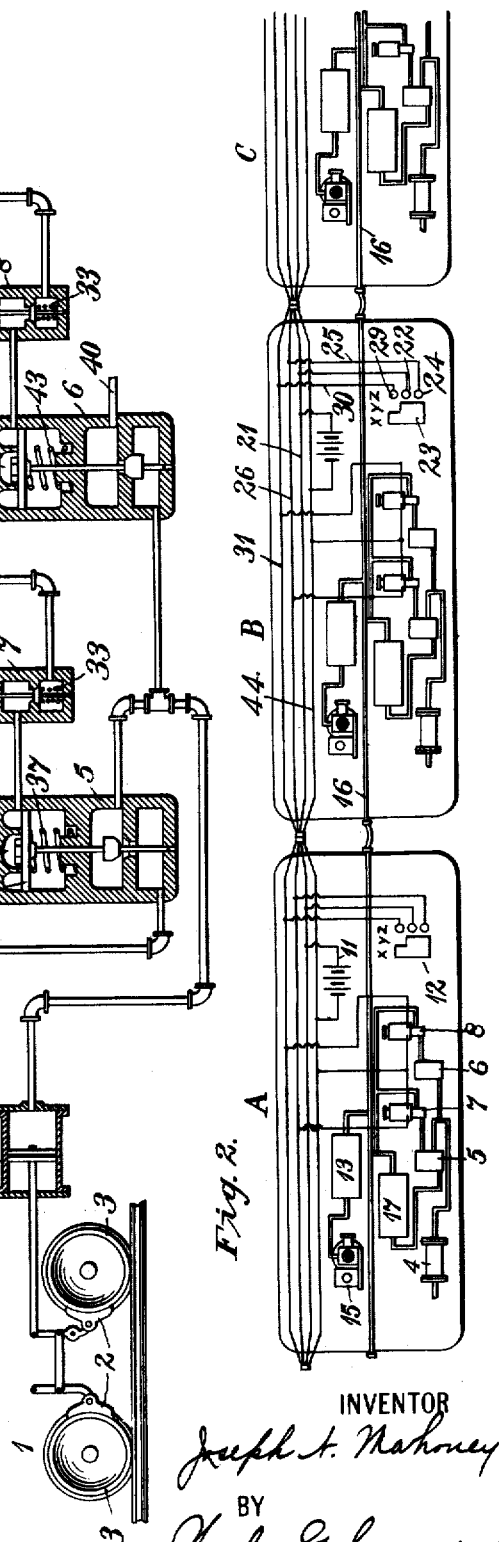
WITNESSES:
Fred H. Miller
R. J. Dearborn
INVENTOR
Joseph N. Mahoney
BY
Wiley G. Carr
ATTORNEYS

UNITED STATES PATENT OFFICE.

JOSEPH N. MAHONEY, OF WILKINSBURG, PENNSYLVANIA, ASSIGNOR, BY MESNE ASSIGNMENTS, TO THE WESTINGHOUSE AIR BRAKE COMPANY, A CORPORATION OF PENNSYLVANIA.

VEHICLE BRAKING SYSTEM.

1,005,252.  Specification of Letters Patent.  Patented Oct. 10, 1911.

Application filed March 25, 1907, Serial No. 364,381.  Renewed August 16, 1911.  Serial No. 644,453.

*To all whom it may concern:*

Be it known that I, JOSEPH N. MAHONEY, a citizen of the United States, and a resident of Wilkinsburg, in the county of Allegheny and State of Pennsylvania, have invented a new and useful Improvement in Vehicle Braking Systems, of which the following is a specification.

My invention relates to vehicle braking systems and has special reference to fluid pressure braking systems which are adapted for the control of vehicles or trains of vehicles.

The object of my invention is to provide a system of the class above indicated that shall be simple in arrangement and that shall embody improved means for automatically applying the brakes, such application being dependent upon a material diminution, either in the fluid pressure of the train pipe or in the voltage of the control circuits and that shall also embody means for applying the brakes, successively upon both sections of a divided train, such operation being dependent upon the separation of the train divisions from each other.

Fluid pressure braking systems for railway vehicles have heretofore been so arranged that the brakes were automatically applied upon a material diminution of the pressure in a train line or pipe which formed a continuous connection between one or more supply sources of fluid pressure and the several vehicles of which the train was composed. If a train so equipped becomes divided or separated into sections, the train line is ruptured and its fluid pressure is thus reduced. Although the brakes are applied to both sections of the train, at substantially the same time because of the reduction of fluid pressure, the two sections may, in some instances, collide by reason of a more rapid retardation of the head section. Another well known train braking arrangement comprises independent braking systems located on the several vehicles of a train, the simultaneous control of the brakes being effected by electro-magnets that are controlled through line conductors which extend throughout the length of the train. These systems automatically apply the brakes only upon the detached vehicles in case the train is divided. With this arrangement, the forward section of the train may be separated from the detached vehicles by several miles without attracting the attention of the motorman or the train driver.

In order to avoid the aforesaid difficulties and objections in the braking systems of the prior art, I provide an electrically governed fluid pressure braking system whereby the brakes are automatically applied, in case a train is divided, first upon the detached section and afterward upon the forward section of the train, irrespective of the number of cars in each section.

Figure 1, of the accompanying drawings, is a diagrammatic view of a braking system arranged in accordance with my invention and Fig. 2 is a diagrammatic view of a train of vehicles each of which is provided with the braking system of Fig. 1.

Referring to the drawings, a vehicle truck 1 is equipped with brakes 2 which are adapted to make frictional engagement with the truck wheels 3 when fluid pressure is supplied to a brake-actuating cylinder 4. The fluid pressure existing in the cylinder 4 is determined by an admission valve 5 and a release valve 6 which are pneumatically operated and which are respectively controlled by auxiliary valves 7 and 8. The valves 7 and 8 are governed by electro-magnet windings 9 and 10 which are energized from any convenient source of electricity, such as battery 11, and are dependent upon the position occupied by a braking controller 12.

Fluid pressure for operating the brakes is obtained from a primary storage tank 13 which is supplied with energy by a compressor 14. An electric motor 15 is shown as employed for driving the compressor but the latter may be geared to the truck axle or be actuated by any other suitable means. A train line or pipe 16 is connected directly to the primary storage tank 13 and conveys fluid pressure to an intermediate storage tank 17 through a stop cock 18 and a check valve 19.

Under normal operating conditions, the admission valve 5 is closed and release valve 6, control valve 7 and control valve 8 are open. In order that these conditions shall obtain, the controller 12 or at least a controller on one vehicle of the train (usually the foremost one) must occupy a position $x$, when circuit connections may be traced as follows: Energy is supplied from battery 11 through conductor 20 and a train line conductor 21 to a contact finger 22 of the controller 12. The circuit is established from contact finger 22 through contact member 23, finger 24, conductors 25, 26, and 27, magnet winding 9 and a negative battery conductor 28. Another circuit is established from contact finger 22 through contact member 23, finger 29, conductors 30, 31, and 32, magnet winding 10 of the valve 8 and the negative battery conductor 28. The structure of the valves 7 and 8 is such that they are held open by the magnet windings 9 and 10, when energized, in opposition to springs 33 and to the fluid pressure which is admitted through the valves.

Assuming that normal fluid pressure is maintained in the train line 16, pressure is admitted, when valve 7 is open, through a pipe 34 and the valve 7 to a chamber 35 of the valve 5. The pressure in this chamber is sufficient to move a plunger 36 in opposition to a spring 37 and the valve 5 is closed. Fluid pressure is also supplied, when valve 8 is opened, from the train line 16 through a pipe 38, and valve 8 to a chamber 39 of the valve 6, in consequence of which this valve is opened and the pressure in brake cylinder 4 is exhausted through a port 40.

The brakes may be applied by an attendant by moving the controller 12 from the position $x$ to a position $z$ in which contact fingers 24 and 29 are disengaged from the contact member 23. In this position, electro-magnet windings 9 and 10 are deënergized and the valves 7 and 8 are closed by reason of the fluid pressure in pipes 34 and 38. The chambers 35 and 39 are exhausted through ports 41 and 42, which are open when the valves 7 and 8 are closed, and the springs 37 and 43 serve to respectively open the valve 5 and close the valve 6. The exhaust port 40 is thereby closed and the admission valve 5 is opened so that fluid pressure is supplied from the intermediate storage tank 17 to the brake cylinder.

After fluid pressure has been admitted to the brake cylinder it may be retained, without holding the admission valve open, by moving the controller 12 to a position $y$ in which the fingers 22 and 24 engage the contact member 23, so that the magnet winding 9 is energized and the valves 5 and 6 are both closed.

If the controller 12 occupies position $x$ and the brakes are released, energy may be admitted automatically to the brake cylinder 4 upon a material diminution in the pressure existing in the train pipe 16, since a reduction of pressure at this point will materially reduce the pressure in the chambers 35 and 39 (valves 7 and 8 being opened) and since the pressure in the intermediate storage tank is not affected by a reduction of pressure in the train line, on account of the check valve 19. A similar result may be effected by an interruption of circuits through the electro-magnets 9 and 10.

The special advantages in the braking system of my present invention may be more readily observed when applied to a train of vehicles, as illustrated in Fig. 2, than when considered in connection with a single vehicle, as illustrated in Fig. 1.

Reference may now be had to Fig. 2, in which a train comprising cars A, B, and C is shown diagrammatically, parts which are similar to those shown in Fig. 1, being designated by the same reference numerals. The positive and negative terminals of the batteries 11 are interconnected by train line conductors 44 and 21, and contact fingers 24 and 29 on the several controllers are connected by train line conductors 26 and 31. In this way, although active batteries may be carried on each car, energy supplied to the magnet windings 9 and 10 may be controlled from any one of the controllers, usually the one located on the foremost car of the train. Assuming that car A is the foremost car of the train; that controller 12 on this car occupies position $x$, and that the corresponding controllers on the cars B and C occupy positions $z$, circuit connections may be traced as follows: Energy is supplied to the magnet windings 9 and 10 of the vehicle A, as hereinbefore described for the system illustrated in Fig. 1 and energy will also be supplied from the positive terminals of the batteries 11, through train line conductor 21 and controller 12 of vehicle A, line conductors 26 and 31, conductors 27 and 32 and magnet windings 9 and 10 of vehicle B to the negative terminal of the battery 11 on this vehicle or through train line conductor 44 to the negative terminal of battery 11. Energy may be similarly supplied to the valve magnets of other vehicles. If the vehicles B and C should become detached from the vehicle A or the vehicle C detached from the remaining vehicles, the magnet windings 9 and 10 on each of the detached vehicles will become immediately deënergized on the interruption of the train lines 21, 44, 26, and 31. The magnets 9 and 10 on the vehicle A, which represents the head section of the train, are still energized, but, by reason of the interruption of the train pipe 16, the fluid pressure existing at this point will be materially reduced and the chambers 35 and 39, as already explained in connection with Fig. 1, will be slowly exhausted so that the valves 5 and 6 will occupy such a position as to admit fluid pressure from the storage tank to the brake cylinder 4.

It will be readily understood that the simultaneous interruption of the electric circuit lines and the train pipe 16 will first effect the application of the brakes on the detached section and afterward on the head section, since the latter results from a more or less gradual diminution of the pressure in the chambers 35 and 39. In this way, all danger of collision between the two sections is avoided, considerable time may be saved, and the possibility of accident reduced by bringing the forward section to rest within a reasonable distance.

I claim as my invention:

1. In a fluid pressure braking system, the combination with a main supply pipe or conduit and a brake cylinder, of a pneumatically operated control valve therefor, an actuating magnet for the control valve, and means for automatically supplying fluid pressure to the brake cylinder, said means being either dependent upon a material diminution of the pressure in the supply pipe or a deënergization of the actuating magnet.

2. In a fluid pressure braking system, the combination with a main supply pipe or conduit, an auxiliary reservoir supplied therefrom, and a brake cylinder, of a pneumatically operated admission valve between the auxiliary reservoir and the cylinder, an electrically operated control valve therefor, an actuating magnet for the control valve, and means for automatically opening the admission valve, said means being dependent upon a material diminution of the pressure in the supply pipe.

3. In a fluid pressure braking system, the combination with a main supply pipe or conduit, a brake cylinder, and an admission valve, an electrically operated control valve therefor, and a magnet winding for the control valve, of means for automatically supplying pressure to the brake cylinder, said means being dependent upon a material diminution of the pressure in the pipe or conduit.

4. In a fluid pressure braking system, the combination with a supply pipe, and a brake cylinder, of an admission valve, an electric control magnet therefor, and means for automatically supplying fluid pressure to the brake cylinder, said means being operative upon either a material diminution of the pressure in the supply pipe or a deënergization of the control magnet.

5. In a vehicle braking system, the combination with a brake cylinder, a supply tank, a feed pipe, a check valve between the feed pipe and the supply tank, an admission valve, and an electric control magnet therefor, of means for automatically supplying fluid pressure to the brake cylinder from the supply tank, said means being dependent either upon a material diminution of the fluid pressure in the feed pipe or a deënergization of the control magnet.

6. In a vehicle braking system, the combination with a brake cylinder, a supply tank, a feed pipe, a check valve between the feed pipe and the supply tank, an admission valve, and an electric control magnet therefor, of means for automatically supplying fluid pressure to the brake cylinder, said means being dependent upon a material diminution of the fluid pressure in the feed pipe.

7. In a vehicle braking system, the combination with a brake cylinder, a supply tank, a feed pipe, a check valve between the feed pipe and the supply tank, an admission valve, and an electric control magnet therefor, of means for automatically supplying fluid pressure to the brake cylinder, said means being dependent upon the deënergization of the control magnet.

8. In a vehicle braking system, the combination with a brake cylinder, a supply tank, a feed pipe, a check valve between the feed pipe and the supply tank, an admission valve, and an electric control magnet therefor, of means for either suddenly supplying fluid pressure to the brake cylinder by reason of a deënergization of the control magnet or more gradually supplying fluid pressure to the brake cylinder by reason of a material diminution of the fluid pressure in the feed pipe.

9. In a train of vehicles, the combination with braking devices mounted on the vehicles, of means, dependent upon the detachment from the train of one or more vehicles, for automatically rendering said devices operative first on the detached vehicles and afterward on the remaining vehicles.

10. In a train of vehicles, the combination with fluid pressure braking cylinders, admission valves, and electrically operated control valves therefor severally mounted on the vehicles, a fluid supply pipe and control conductors that extend the entire length of the train, of means dependent upon the rupture of the control conductors, for first bringing the detached vehicles to rest, and means, dependent upon the diminution of pressure resulting from the rupture of the supply pipe, for bringing the remaining vehicles to rest.

11. In a train of vehicles, the combination with fluid pressure braking cylinders, admission valves, electrically operated control valves therefor, and auxiliary storage reservoirs severally mounted on the vehicles, a fluid supply pipe and control conductors that extend the entire length of the train, of means, dependent upon the detachment from the train of one or more vehicles, for automatically applying the brakes on the detached train section first and on the remaining section afterward.

12. In a train of vehicles, the combination with fluid pressure braking cylinders, admission valves, electrically operated control valves therefor, and auxiliary storage reservoirs severally mounted on the vehicles, a fluid supply pipe and control conductors that extend the entire length of the train, of means, dependent upon the rupture of the control conductors, for supplying the brakes in case one or more vehicles become detached, and means, dependent upon the rupture of the supply line, for applying the brakes on the main train section.

13. In a train of vehicles, the combination with fluid pressure braking cylinders, admission valves, electrically operated control valves therefor, and auxiliary storage reservoirs severally mounted on the vehicles, a fluid supply pipe and control conductors that extend the entire length of the train, and means, dependent upon a detachment from the train of one or more vehicles, for applying the brakes on all the vehicles, the brakes on the rear section of the train being supplied first.

In testimony whereof, I have hereunto subscribed by name this 5th day of March, 1907.

J. N. MAHONEY.

Witnesses:
 HOWARD L. BEACH,
 BIRNEY HINES.